(12) United States Patent
Tartivita

(10) Patent No.: US 6,182,522 B1
(45) Date of Patent: Feb. 6, 2001

(54) TRANSMISSION FOR AUTOMOTIVE VEHICLES OR MACHINERY

(76) Inventor: Santo Romano Tartivita, P.O. Box 142, Atlantic Highlands, NJ (US) 07716

(*) Notice: Under 35 U.S.C. 154(b), the term of this patent shall be extended for 0 days.

(21) Appl. No.: 09/231,676

(22) Filed: Jan. 15, 1999

(51) Int. Cl.$^7$ .................................................. F16H 3/14
(52) U.S. Cl. ................................................ 74/333; 74/335
(58) Field of Search ........................................ 74/333, 335

(56) References Cited

U.S. PATENT DOCUMENTS 5,626,056 * 5/1997 Owens .................................. 74/333

* cited by examiner

*Primary Examiner*—Dirk Wright
(74) *Attorney, Agent, or Firm*—Ezra Sutton

(57) ABSTRACT

A transmission with two parallel shafts has an input shaft that may be directly connected to an engine crankshaft. The input shaft carries fixed gears that are at all times meshed with corresponding gears on the output shaft. Also, the input shaft has a screw type pump to circulate and cool fluids.

The output shaft carries various modules. Each module is made up of an electromagnetic clutch with a parallel gear-plate on each side. Modules can be added or removed. All gears on the output shaft are on bearings and free to rotate.

When a rheological and/or a magnetizable fluid between the electromagnets and the adjacent gear-plate are electrically energized, the fluid between them changes phase and/or it becomes magnetized and/or solidified.

The electromagnetic force also pulls the sliding gear-plate to bond to the electromagnet. Each side of the electromagnet is energized independently to either attract or repulse the adjacent gear-plate.

When one of the various electromagnetic clutches is installed between the engine crankshaft and the transmission input shaft. Synchronization type clutch gear-plates may be installed on the output shaft. The manual gear selector transfers electrical current from a source to the various contacts on the transmitter and thereafter along the output shaft and to the desired side of the electromagnet.

17 Claims, 7 Drawing Sheets

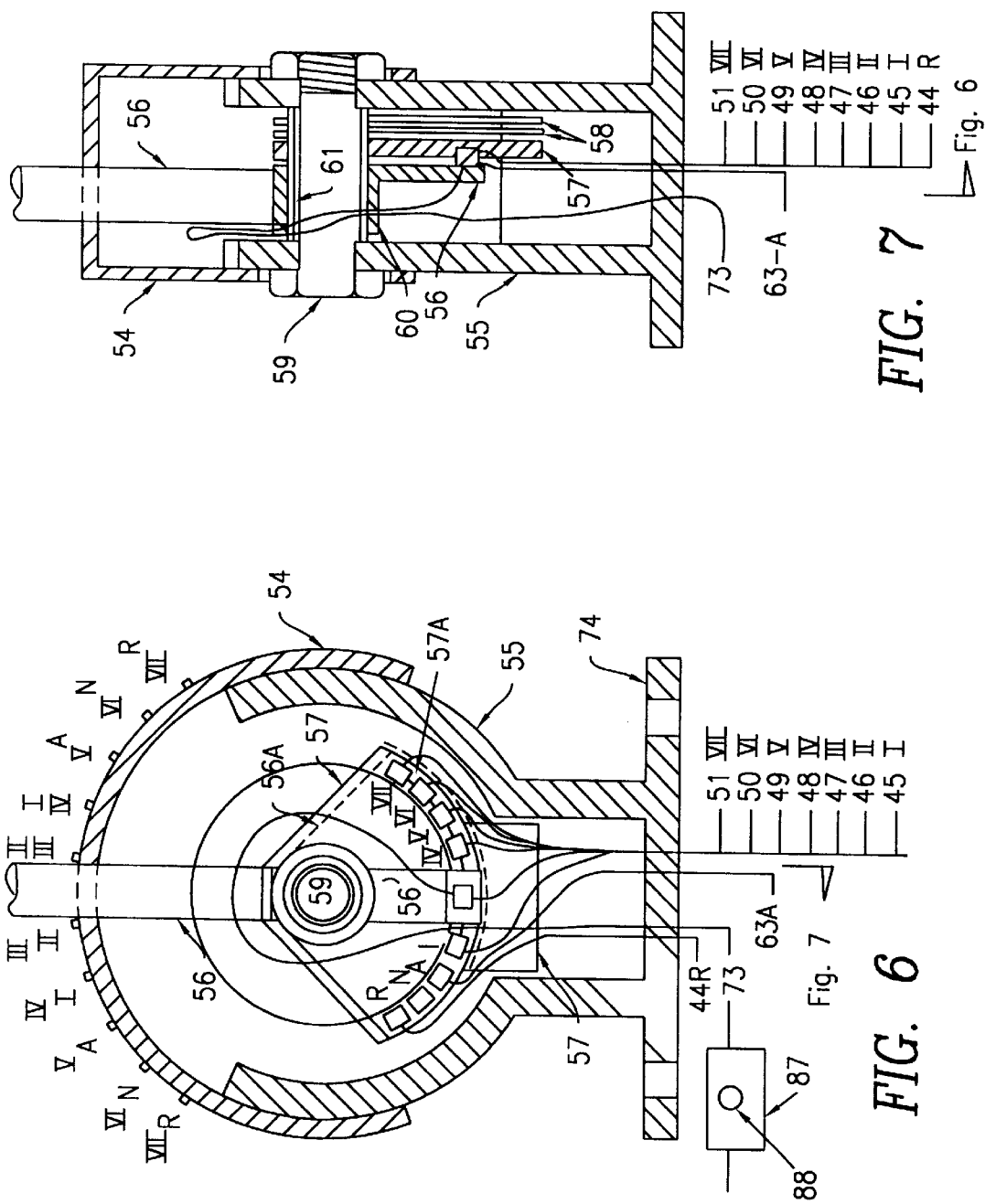

TRANSMISSION FOR AUTOMOTIVE VEHICLES OR MACHINERY

BACKGROUND OF THE TRANSMISSION

In general existing manual and automatic automobile transmissions are complicated, inefficient, expensive, and heavy. At present few automatic automobile transmissions exist with seven or more gears. The present engineering designs are extremely difficult to build and disassemble.

The present art utilizes pedal friction clutches or torque converters or very complicated electromagnetic clutches for coupling the engine to the transmission shaft and very complicated oil pumps with intricate valve boxes and channels to distribute high pressure oil to control clutches so gears can be meshed or activated. Recently, computers have been incorporated to better control the timing for meshing gears in automatic transmissions, but the basic engineering designs have changed very little.

TRANSMISSION FOR AUTOMOTIVE VEHICLES OR MACHINERY

SUMMARY OF THE INVENTION

Transmission type1 has an input shaft supported by the casing end bearings. The input shaft is directly connected to the engine crankshaft and rotates at the same speed and direction as the engine crankshaft. The input shaft has one canal to allow the inner annulus of the gears to be keyed with the shaft. The gears slide along the shaft and are mechanically fixed to the same shaft.

Spacers are installed between gears to prevent longitudinal movement of the gears and strengthen the shaft. A screw type pump is machined from the end of the input shaft to push the fluid from the lower interior casing through the canal and the output shaft to lubricate bearings, gears, spacers and electromagnets.

The output shaft is also supported by the casing end bearings. The output shaft has six canals. One canal engages the inner annulus of the free rotating gear tooth, one canal transports fluid and four canals carry electrical conduits (one canal for each electromagnet).

Gears, electromagnets, and spacers, are all assembled by sliding them along the shaft. The reverse gear, also on bearings, is connected to a third gear (idler gear not shown) or a belt-chain connected to the input shaft-gear to cause rotation in the same direction as the input shaft. All gears on the output shaft are on bearings and free to rotate and slide axially. They are meshed with corresponding gears on the input shaft. These gears rotate opposite the gears of the input shaft.

Fluid is transported along the output shaft canal and pushed through weep holes to lubricate all bearings of the transmission and spaces between the electromagnet and adjacent spaces and between gears and spacers.

Electrical current is transmitted to the electromagnets in conduits inside the output shaft canals. Only one side at a time of the electromagnet is energized "positive" and therefore attracts only one gear-plate. Bonding between the electromagnet and the adjacent gear is achieved by strong magnetic forces attracting the adjacent sliding gear-plate and also by energizing the rheological fluid and/or magnetizable fluid between the electromagnet and the gear-plate from liquid to solid which cause friction between the magnet and the gear-plate.

Transmission type 2 uses various electromagnetic clutches. In this type of transmission the input shaft is connected to the engine crankshaft by an electromagnetic friction clutch or an electromagnet ferrous powder clutch. Each side of a module on the output shaft also has an electromagnetic clutch with a synchronization mechanism. Bonding between the electromagnet and the adjacent gear-plate is achieved during and after the gear is synchronized with its adjacent electromagnet, while at the same time the electromagnet pulls the gear-plate toward itself.

Simple manual, semi-manual or automatic gear selectors are claimed that direct electric current to the various electromagnets. Various electromagnets can be used in combination with each other or individually.

The advantages of these inventions are as follows:
1. There is no need to mesh gears.
2. There is no need for a torque converter.
3. There is no need for a high pressure oil pump or hydraulic cylinders to activate clutches.
4. There is no need for a valve box and valves to distribute fluids.
5. There is no need for an intermediate servo.
6. There is no need for sophisticated computers.
7. There is no need for a modulator.
8. There is no need for a governor.
9. There is no need for an extension housing.
10. There is no need for epicyclic gears.
11. A substantial number of gears can be added or removed with very minor changes.
12. The gear ratio can be unlimited.
13. The number of parts are substantially reduced by more than 80%.
14. The time to assemble or disassemble the transmission can be cut by more than 90%.
15. Very few tools are needed to assemble these transmissions.
16. The cost for building this transmission can be cut by more than 80%, when compared to conventional automobile transmissions.

Since this transmission is radically different from the present art it is helpful to review the attached DRAWINGS 1, 2, 3, and 4.

BRIEF DESCRIPTION OF THE DRAWINGS

FIG. 6, DRAWING 3 is a longitudinal section of the manual and semi-automatic gear selector showing the various electrical contacts, electrical wire distribution, stick shift, gear positions, and current regulator.

FIG. 7, DRAWING 3 is a cross section of the manual gear selector showing support mechanism for stick shift, springs and electrical contact points.

DETAILED DESCRIPTION OF THE INVENTION

Transmission Case

Figure 1:
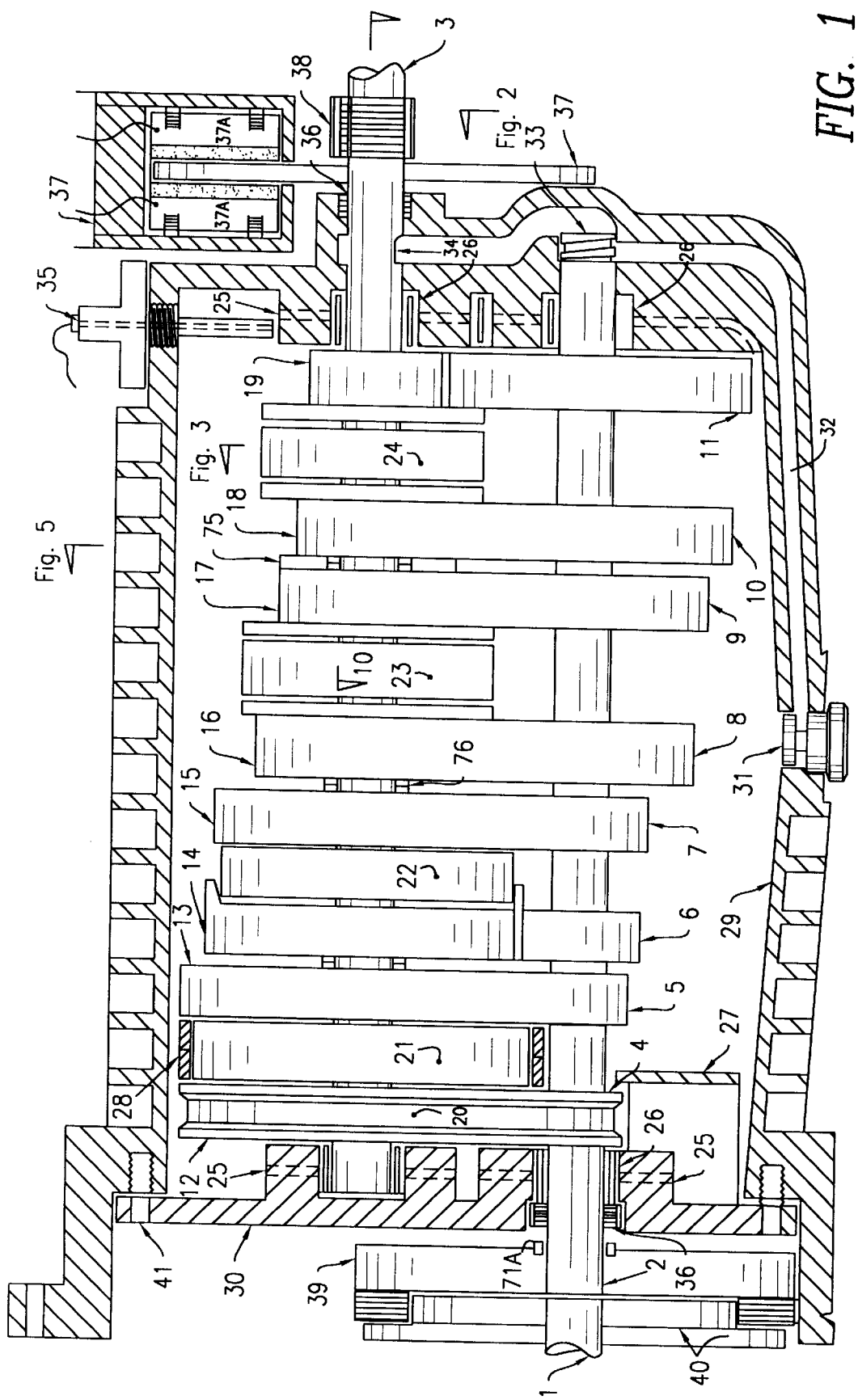
FIG. 1, DRAWING 1 is a longitudinal section of the transmission showing the relationship between all major parts attached to the input and output shafts and the casing of the transmission.

FIG. 1 is a longitudinal section showing the transmission casing 29 with input shaft 2 and output shafts 3, gear-plates, electromagnets, spacers, emergency hand disc-break, commutator, bearings, canals, flywheel, fluid pump and filter, fluid dip stick, temperature gauge, baffle and oil pump end plates. Shaft 1 is the engine power source and supports flywheel 40.

Input shaft 2 is supported by end bearings 26 and is either directly connected to the engine or can be joined to the engine flywheel by electromagnet 39 or an alternate electromagnet. Gears 4,5,6,7,8,9,10, and 11, pump 33 and electromagnet 39 are keyed to shaft 2 and rotate at the same speed and direction as the engine.

Output shaft 3 is supported by end bearings 26, gears 12,13,14,15,16,17,18, and 19, are on bearings and free to rotate around shaft 3 and slide axially. The gears inner race 26A FIG. 5 electromagnets 21, 22, 23, and 24, hand brake disc 37, transmitter 38, and spacer 75, are keyed to shaft 3. Reverse gear 4 is keyed to shaft 2, it causes rotation to shaft 3 either by a belt-chain 20 or a separate idler gear (not shown). Gear 4 is meshed to the idler gear which is meshed to gear 12. Gear 12 (reverse) rotates opposite to all other gears on shaft 3.

Gears 5, 6, 7, 8, 9, 10, and 11, keyed to shaft 2 are always meshed with corresponding gears 13, 14, 15, 16, 17, 18, 19, and are the forward gears. Gear 14 shows an extended arm ring over the electromagnet to synchronize the rotation of the gear-plate with the electromagnet and to maximize the surface area in contact with the electromagnet similar to 18 FIG. 13.

Gear 16, 17, 18, and 19, have a plate adjacent to the gears to increase the bonding surface area facing the electromagnet. Belt-chain 20 can be substituted for the idler gear. When shaft 2 rotates the belt-chain causes shaft 3 to rotate in the same direction as shaft 2.

Each electromagnet module 21, 22, 23, and 24, keyed to shaft 3 has a multitude of electrical supply sources and face a parallel and free rotating gear-plate on each side. Each side of the electromagnet is independently energized to pull its adjacent gear-plate . The gear-plate causes (when bonded with the electromagnet) rotation of the electromagnet on the output shaft 3.

Figure 3:
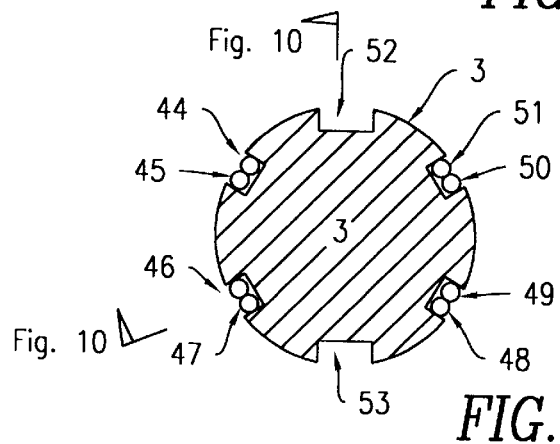
FIG. 3, DRAWING 2 is a cross section of the output shaft showing the various canals and electrical conduits.
Figure 4:
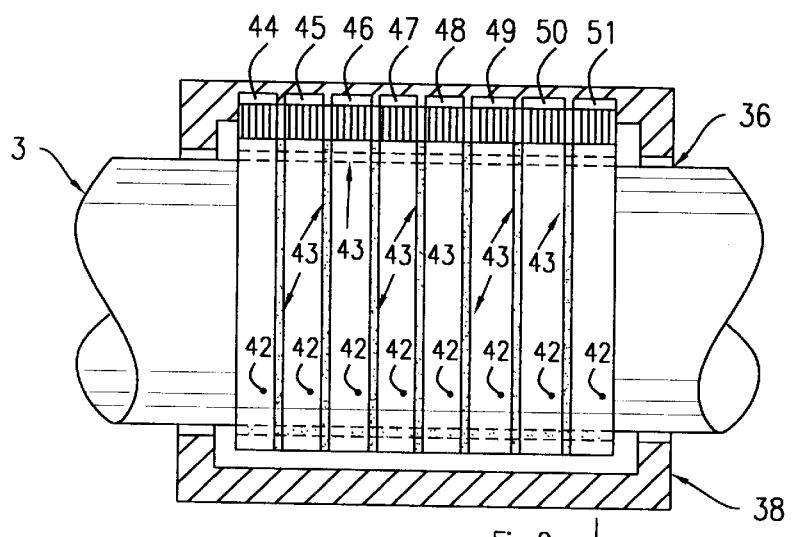
FIG. 4, DRAWING 2 is a longitudinal section of the electrical commutator showing the various brushes, rings and shaft.

The electrical power source to the electromagnets comes from electrical wires 44, 45, 46, 47, 48, 49, 50, and 51, FIGS. 3 and 4 that travel within canals of shaft 3.

Fluid supply lines 25, lubricate and cool bearings 26. The fluid in housing 29 goes through canal 32 and is pushed by pump 33 towards shaft 3, the interior housing 34 is shaped to direct the fluid to shaft 3 canal 52. Canal 52, FIG. 3, on shaft 3 extends to the opposite side of the shaft to lubricate all bearings, gears and spacers.

Bearings 26 support shaft 2 and 3. Bearings 26c, FIG. 5 for gears 12, 13, 14, 15,16,17,18, and 19 are lubricated by the fluid canal 52, FIG. 3, on shaft 3.

Baffle 27 controls turbulence adjacent to reverse gears 4 and 12. Interior emergency hand brake 28 surrounding electromagnet 21 is operated by conventional methods (not shown). Transmission housing 29 encases all gears, shafts 1 and 2, electromagnets, spacers and end plate 30, bearings, fluids, and flywheel.

End plate 30 supports shaft 1 and 2, and closes the transmission case.

Fluid clean out bolt 31 acts both as a filter and a removable screw type bolt to drain the transmission fluid. The fluid flows from housing 29 through filter 31 and through canal 32. The purpose of canal 32 is to cool the transmission fluid and to transport the fluid from the inner housing 29 to pump 33 and on to shaft 3.

Screw pump 33 is machined at the end of shaft 2 and pushes fluid from canal 32 to canal 52, FIG. 3, on shaft 3.

The interior case is curved at 34 and space is provided around shaft 3 to allow fluid to be transferred from a perpendicular source from canal 32 to a rotating shaft 3 and along canal 52. Fluid dipstick 35 measures fluid level and temperature of fluid of interior housing 29. Housing seals 36 prevent fluids from escaping from interior housing 29 to exterior.

Auxiliary emergency hand disc break 37 is an alternate type emergency hand break. It is located on exterior of housing 29 and fixed to shaft 3.

Flywheel 40 is a modified flywheel-friction plate able to couple with electromagnet 39. The rotating flywheel can cause electromagnet 39 to generate electricity.

Figure 2:
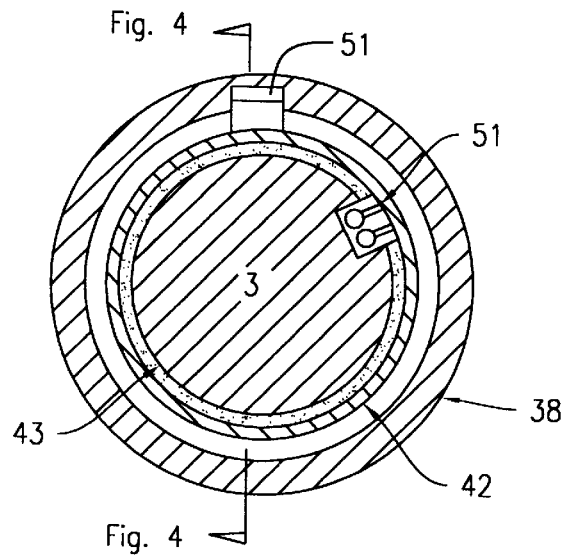
FIG. 2, DRAWING 2 is a cross section of the electrical commutator on the output shaft showing the contact rings and brushes.

FIG. 2 is a cross section through transmitter 38 FIG. 1 and shaft 3 FIG. 1. This section is taken at wire 51 FIG. 4. Shaft 3 shows one canal with one electrical wire-brush 51. The non electrical conductive ring 43 surrounds shaft 3 and the electrical conductive metallic ring 42 surrounds ring 43.

FIG. 3 is a cross section of shaft 3 FIG. 1, it shows cross section with canals to accommodate conduits 44–45, 46–47, 48–49, and 50–51. Canal 52 carries fluids and canal 53 is a space to be keyed with the gears, electromagnet, and spacers.

A Multiple Commutator

FIG. 4 is a longitudinal section of commutator 38 FIG. 1. Commutator 38 receives electrical current from either the manual or automatic gear selector FIGS. 6,7,8 and 9. Commutator 38 transmits current to rotating shaft 3 and to electromagnets 21, 22, 23, 24, and 39 FIG. 1. Wires to electromagnet 39 come from the current control box 87 FIG. 6.

Figure 8:
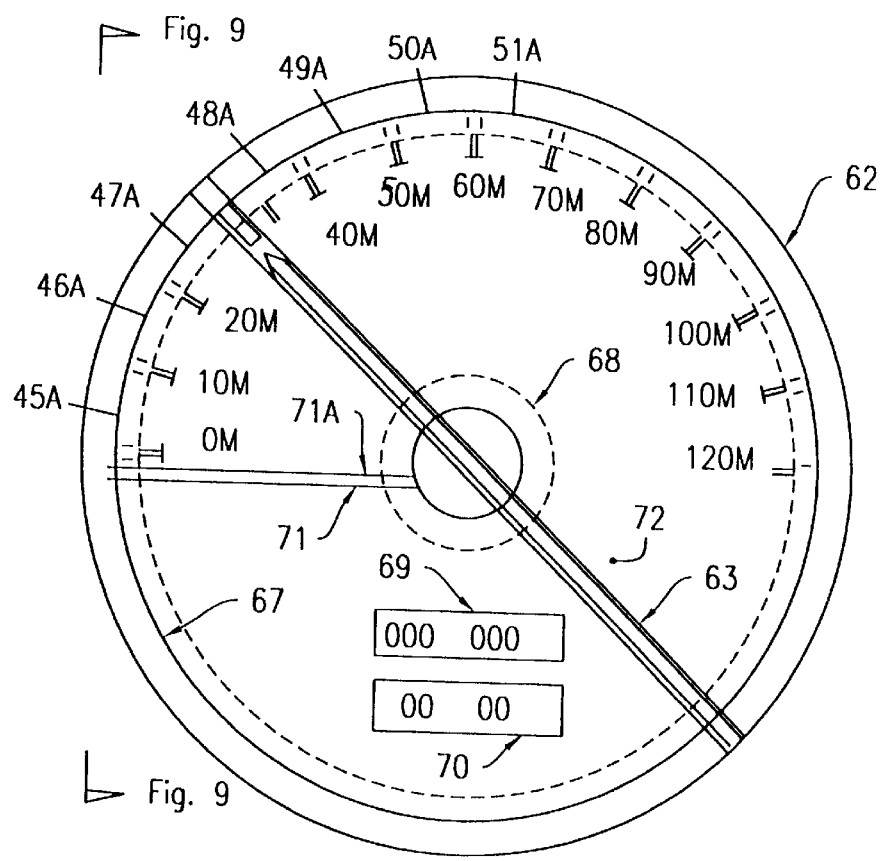
FIG. 8, DRAWING 3 is a plan of the automatic gear selector, a modified speedometer box, showing a suggested position where various speeds start and end.
Figure 9:
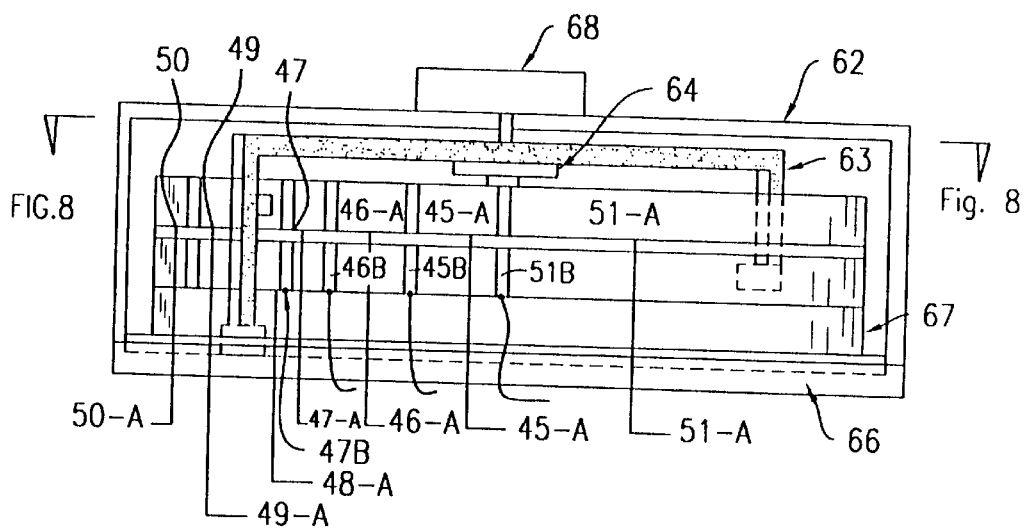
FIG. 9, DRAWING 3 is an elevation of the automatic gear selector and speedometer box shown in FIG. 8, showing the sides of the electrical terminal strips, the speedometer pointer with side terminal and electrical wires.

The electrical current from the gear selector FIG. 6 and 7 is carried by wires 45-I, 46-II, 47-III, 48-IV, 49-V, 50-VI, and 51-VII FIG. 6 and 7, electrical current from the gear selector FIG. 8 and 9 is carried by wires 45-A, 46-A, 47-A, 48-A, 49-A, 50-A, and 51-A FIGS. 8 and 9. Current is transmitted from these wires to rings 44, 45, 46, 47, 48, 49, 50, and 51 FIGS. 4 & 10.

Housing 38 FIG. 4 is fixed to the frame and does not rotate. Commutator 38 has a non electrical conductive base 43 FIG. 2 surrounding shaft 3, separate electrical conductive metal rings 42 surround ring 43 FIGS. 2&3. Each ring 42 is connected to its own wire encased in the canals of shaft 3 FIG. 3 and extend to one side of the corresponding electromagnets.

Wires 44 and 45 FIG. 4 supply electrical current to electromagnet 21 FIG. 1 to bond with gears 12 or 13 FIG. 1.

Wires 46 and 47 FIG. 4 supply electrical current to electromagnet 22 FIG. 1 to bond with gears 14 or 15 FIG. 1.

Wires 48 and 49 FIG. 4 supply electrical current to electromagnet 23 FIG. 1 to bond with gears 16 or 17 FIG. 1.

Wires 50 and 51 FIG. 4 supply electrical current to electromagnet 24 FIG. 1 to bond with gears 18 or 19 FIG. 1.

Seals 36 FIG. 4 prevent the elements from contaminating the interior of housing 38.

Figure 5:
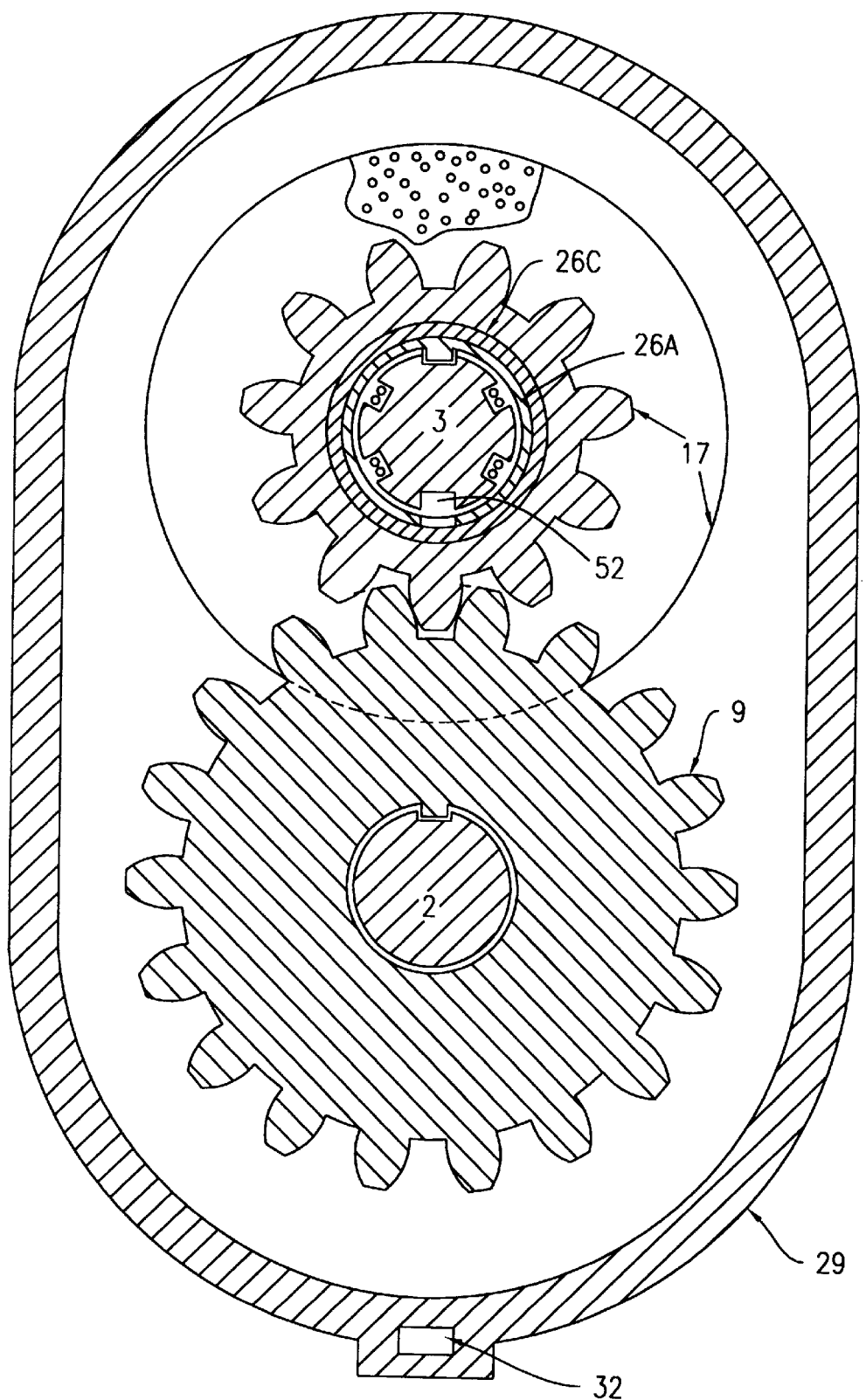
FIG. 5, DRAWING 2 is a cross section of the transmission showing the outer case, fluid canal, and gears on the input and output shaft.

FIG. 5 is a cross section through housing 29 FIG. 1, gears 9, 17 and shafts 2 and 3. Gear-plate 17 with the end plate in the background sits on bearings 26C that surrounds a metallic ring race 26A and is free to rotate. Inner race 26A has a tooth and is keyed to shaft 3 and carries bushing 26C. Canal 52 carries fluid to bushing 26C through a hole on ring 26A. The fluid is discharged through the sides of bearing 26C, between sides of gear 17, electromagnet 23 FIG. 1, gear 18 FIG. 1, or spacer 75 FIG. 1. Gear 17 FIG. 5 is always meshed to gear 9. Gear 9 is keyed to shaft 2.

Gear Selector

FIG. 6 is a longitudinal section of the manual gear selector, lower casing 55 FIGS. 6 and 7 is fixed to base 74 and supports rotating uppercase 54 with handle 56 that are connected to bolt and nut 59. Base 74 is stationary and is connected to frame (not shown). Plate 57 with electrical contacts R, A, I, II,III, IV, V, VI, VII, spring 58 FIG. 7 are supported by bolt 59 FIG. 7 and prevented from rotating by the lower casing 55, shims 60 and spacer 61 FIG. 7 are also supported by bolt 59. The lower end of handle 56 has a protruding terminal contact that engages recessed terminal contacts on plate 57 FIGS. 6 and 7, as the handle 56 is rotated from contact to contact it moves in and out of the recessed contacts on plate 57. Plate 57 is pressured against the handle 56 by spring 58 FIG. 7. The compression and tension of springs 58 FIG. 7 and therefore on handle 56 can be adjusted by the bolt-nut 59, the spacer 61 FIG. 7 prevents the bolt and nut 59 from over tightening the casing 55.

Electrical current to the electromagnet comes from the battery to the induction current control box 87 through wire 73 which is connected to the terminal on handle 56, for example, when the terminal on handle 56 makes contact with terminal I electrical current is transferred to wire 45 I on to wire 45 in FIG. 4 and to the electromagnet 21 which will attract gear-plate 13. If, for example, you want the gear to be selected automatically handle 56 is rotated to terminal A and contact is made with wire 63A, wire 63A is split into two wires 71 and 71A FIG. 8. Current to the electromagnet is selected by gear selector FIGS. 8 and 9. Terminal N is neutral, plate 57 has a cavity to let handle 56 make a positive stop but has no electrical contact or wire therefore, no current is transmitted through the gear selector 56. An alternate compound fan shaped plate 56A is used instead of a single contact handle 56. Handle 56A has multiple contacts, one for each side of the electromagnet. All forward gears have a preselected current flow to the electromagnet but less than 100%. Only the lowest gear selected is 100% bonded to it's electromagnet. All higher gears are partially bonded with controlled slippage.

Plate 57 supports the recessed terminals R, N, A,I, II, III, IV, V, VI and VII to control the electromagnet and gears within the transmission.

Plate 57, at a different level, also supports a continuous Plate 57A that spans the spaces between the recessed terminals R, N, A,I, II, III, IV, V, VI and VII but they do not touch each other. Plate 57A has a conduit to control the electromagnet between the engine and the transmission.

As the gear selector rotates and steps out of the recessed terminals it disconnects the current flow to the electromagnet of the transmission interior and the gear separates from the electromagnet. When the gear selector touches the space (plate) between the recessed terminals it transfers the current flow to the electromagnet between the engine and the transmission, disconnecting the electromagnet from the flywheel.

As the selector rotates further and engages another recessed terminal, the current flow to the flywheel-electromagnet stops and the flywheel- electromagnet, due to spring forces, engage with each other once again, while the current energizes the next electromagnet on the interior of the transmission and bonds a gear-plate to the electromagnet.

FIG. 7 is a cross section of the manual gear selector FIG. 6 showing the handle contact with plate 57.

Automatic Gear Selector

FIG. 8 is a plan of the automatic gear selector. A transparent casing 62 encloses a modified speedometer box 72, speedometer pointer 63 FIGS. 8 and 9 has extended arms to the sides of the box with terminal contacts and is supported by plate 64 FIG. 9. The contacts could be on the face of the speedometer box 72 FIG. 8 (not shown). Casing 68 contains coiled wire 71 and 71A FIG. 9 to minimize friction on the rotation of the speedometer pointer 63. Odometer 69 and 70 are shown in FIG. 8. Current from wire 71 and 71A is transmitted along the speedometer pointer 63 and to the side terminal contact plates 45A, 46A, 47A, 48A, 49A, 50A, 51A and on to corresponding contact rings 44, 45, 46, 47, 48, 49, 50,51 on commutator 38 FIG. 4 and on to the transmission electromagnet 21, 22, 23, and 24 FIG. 1.

Electric current from wire 71A FIG. 8 and 9 is transmitted to the side terminal contacts 45B, 46B, 47B, 48B, 49B, 50B, 51B FIG. 9. Wires from contacts 45B through 51B combine to form a single wire 71B FIG. 9 which goes directly to the electromagnet 39 FIG. 1. Induction box 87 FIG. 6 controls the current and induced electrical current that is sent to the electromagnets and controls the speed and time that the electromagnet has to attract it's adjacent gear-plate. The electrical current received by the electromagnets from the induction box 87 is a variable current so the electromagnets can be activated and deactivated as selected by control box 87 FIG. 6. By means of a manual switch 88 FIG. 6 the current supply can be changed for the time that the electromagnets have to attract or loosen the grip on gear-plates 12, 13, 14, 15, 16, 17, 18, 19 and fly wheel 40 FIG 1.

FIG. 9 is an elevation of the automatic speedometer gear selector of FIG. 8. It shows the side arms of the speedometer pointer 63, plate 64 supporting the speedometer pointer, two levels of contact plates with spacers in between and wires attached to the contact plates. Coil container 68 sits on top of housing 62 and 66. Inner housing 67 has an inner conductive cover to stop magnetic interference between the inner magnets and the exterior wiring.

Gears Electromagnet and Commutator

Figure 10:
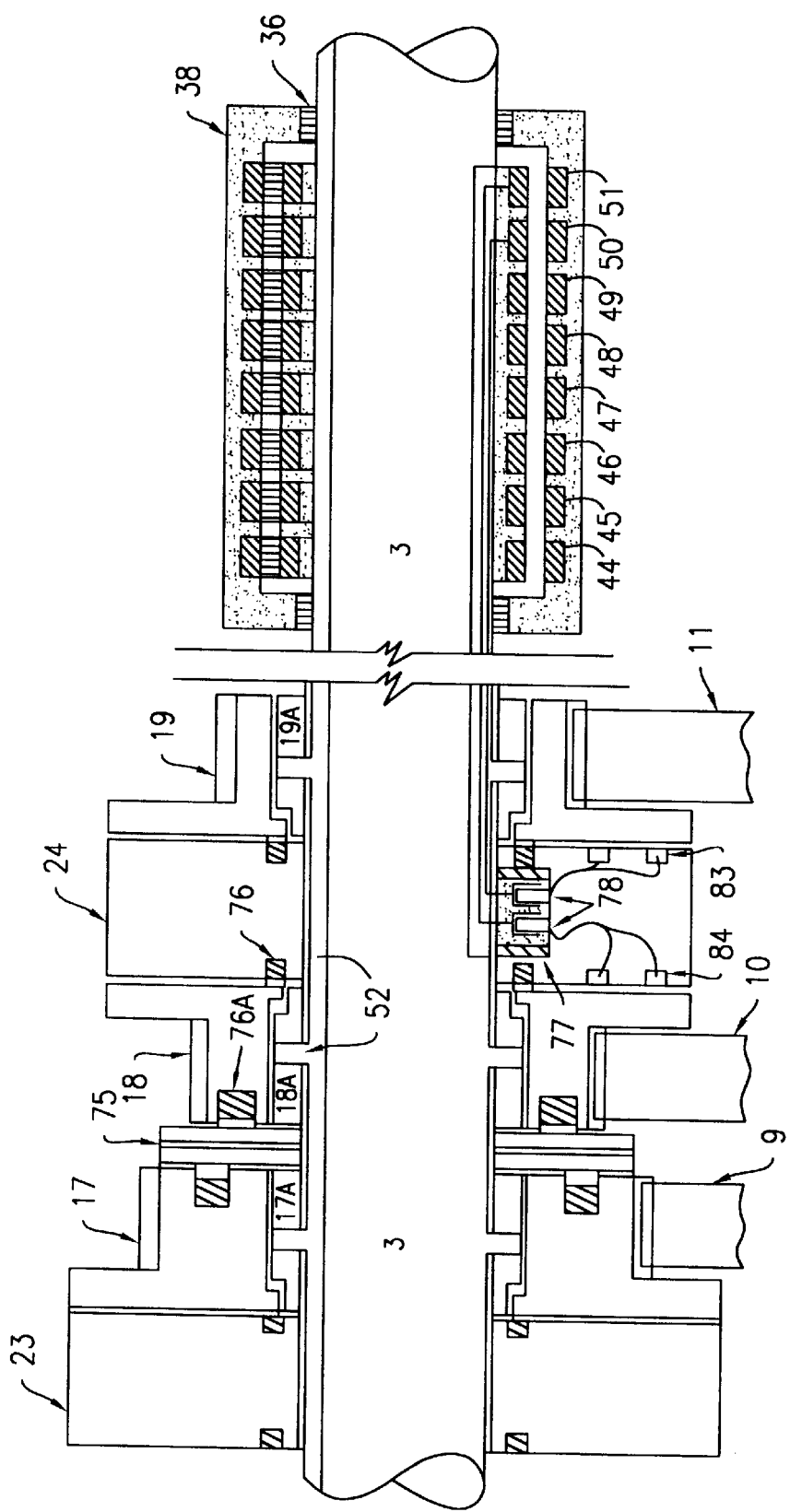
FIG. 10, DRAWING 4 is a section through a parallel electromagnetic clutches. 23, 24 gear 17,18, and 19, spacer 75 and the electrical transmitter 38 that are attached to output shaft 3.

FIG. 10 is a partial section of the output shaft 3 showing electromagnet 23 and 24 with side gear-plate 17,18,19, and spacer 75 and electrical transmitter 38. All said parts are keyed to the output shaft 3. Gears-plate 17,18, and 19 have an inner race 17A, 18A, and 19A that are keyed to shaft 3. The outer race supports the gear side plate. The side plate could be either the gear itself or the gear has a plate. The gear-plate slides side ways along the shaft axis to bond with the electromagnet 24. Lateral movement away from the electromagnet is controlled by corresponding steps on the inner and outer races of the bearing gear-plate 17, 18 and 19 or spacers 75. Oil is forced through the bearings and between the gear-plate and the electromagnet and through the spacers 75 by canal and holes 52. Electromagnet 24 shows electrical connections between the electromagnet and commutator 38. Wires 50 and 51 come from commutator 38 and are connected to electromagnet 24 by male and female plugs 77 and 78 built in to the inner race of the electromagnet facing shaft 3. The electrical contacts within electromagnet 24 are fluid proof by seal 77. Wires 77 and 78 energize opposite sides of electromagnet 24 by selecting the adjacent gear and electrical conduit. Separate wires could also run on canals in the electromagnet surface, to measure temperature and slippage between the electromagnet and the gear-plate. Each side of the electromagnet is independently energized. When one side of electromagnet 24 is energized the fluid between the gear-plate 19 and the electromagnet 24 is magnetized and solidifies and at the same time the electromagnet pulls the gear-plate toward itself to bond to it.

Spring-Loaded Electromagnetic Clutch

Figure 11:
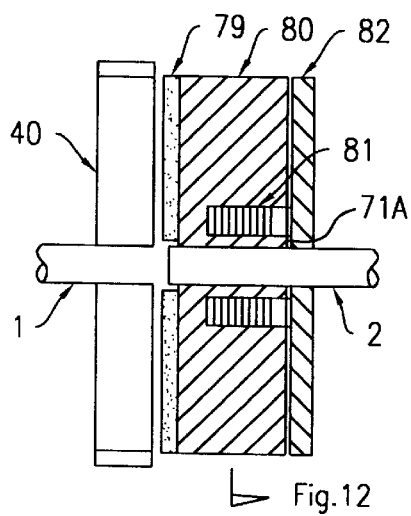
FIG. 11, DRAWING 4 is a section of a friction spring loaded electromagnetic clutch, facing the flywheel or a motor plate.

FIG. 11 is a section through a friction spring-loaded electromagnetic clutch. Electromagnet 80 with a friction surface 79 is meshed with a splined shaft 2. Plate 82 is fixed to shaft 2 and flywheel 40 is attached to a plate and/or shaft 1. Springs 81 are connected to a controller ring 81A that sits inside the electromagnet. Springs 81 push against plate 82 which forces the electromagnet 80 against the flywheel 40. When electromagnet 80 is energized through wire 71A an inducent current slowly pulls electromagnet 80 against plate 82 and away from flywheel 40. When electromagnet 80 is slowly de-energized the springs again slowly push the electromagnet against the flywheel. This type of clutch, unless energized, is always engaged to the flywheel.

Figure 12:
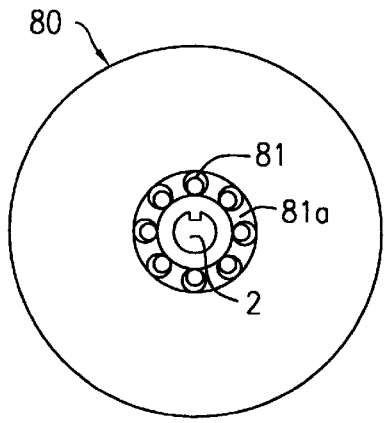
FIG. 12, DRAWING 4 is a cross-section of FIG. 11 through the electromagnet showing the shaft and springs in relation to the electromagnet.

FIG. 12 is a cross section of FIG. 11 showing electromagnet 80 attached to shaft 2 and the relationship of the springs within the electromagnet.

Electromagnetic Clutch with Synchronous Mechanism

Figure 13:
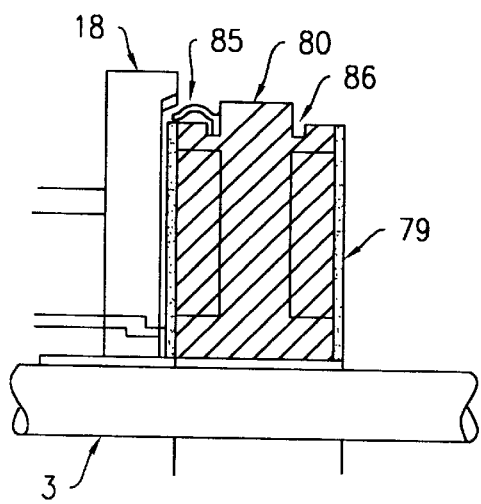
FIG. 13, DRAWING 4 is a section of an alternate electromagnetic clutch with a synchronization mechanism.

FIG. 13 is a section of an electromagnetic clutch that uses a magnetizable rheological fluid, and a synchronization mechanism to bond the gear-plate 18 to the electromagnet 80. Electromagnet 80 is keyed to shaft 3 and has a friction surface facing gear-plate 18, each side of the electromagnet has a circumferential castellated cavity that holds in place spring 85 or a castellated wedge (not shown),the teeth in spring 85 that sit in the electromagnet cavity prevents the spring from moving side ways or rotationally. The gear-plate 18 has an outer circumferential extended wedge arm. The interior electrical system of electromagnet 80 is similar to electromagnet 24 FIG. 10. When electromagnet 80 is energized the fluid between gear-plate 18 and electromagnet 80 is magnetized and the fluid solidifies slowly the gear-plate 18 is pulled by the electromagnet 80, a portion of the solidified fluid is squeezed through holes of the perforated gear-plate, the solidified fluid acts both as a shock absorber and the friction material between the gear-plate 18 and electromagnet 80. As the gear-plate moves laterally it compresses wedge spring 85 causing the rotational speed of gear-plate 18 and the electromagnet 80 to synchronize until both are bonded together. When electromagnet 80 is de-energized the solidified fluid becomes fluid once again and pulls the gear-plate away from the electromagnet spring 85.

Electromagnetic Clutch within a Gear-Plate

Figure 14:
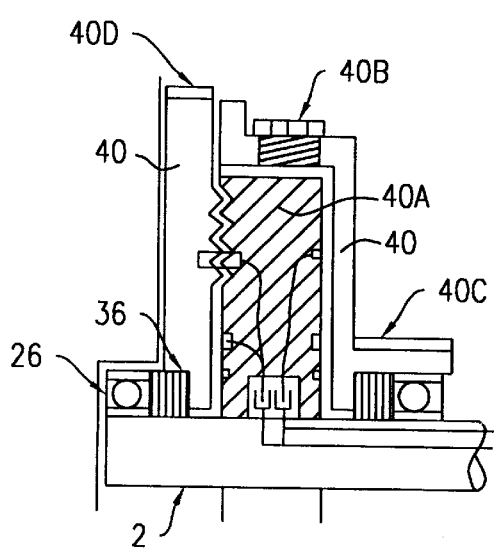
FIG. 14, DRAWING 4 is a section of an alternate electromagnetic clutch which is completely encased within a gear-plate. Magnetic powder or rheological fluid fills the inner space between the electromagnet and the inner gear surface.

FIG. 14 electromagnet 40A is fixed on shaft 2 and encased within an adjacent gear 40. The gears have bearing 26 and are free to rotate. A removable plug 40B is used to allow filling the space cavity between the electromagnet and the interior gear space. Seals 36 are installed between the inner gear legs and the shaft to prevent powder or fluid leakage.

The surface of the electromagnet and the opposing interior face of the gears are textured and/or grooved for better bonding between the two surfaces.

Because the electromagnet spins with the shaft the centrifugal forces push the magnetizable fluid powder toward the outer electromagnetic surfaces, hence when the electromagnet is electrically energized the fluid-powder becomes solidified and bonding occurs between inner gear surfaces and the charged electromagnet.

What I claim as my inventions:

1. A transmission for vehicles and machinery for the purpose of changing engine speeds and torque for moving loads or rotating shafts, comprising:
   a) a transmission housing including an interior housing compartment and being connected to the engine;
   b) a rheological or magnetizable fluid within said interior compartment of said transmission housing;
   c) an input shaft and an output shaft mounted in said interior housing compartment in a parallel arrangement;
   d) a plurality of fixed gears mounted on said input shaft and being rotated by said input shaft;
   e) said output shaft having mounted thereon a plurality of electromagnetic clutch plates, each having an adjacent free rotating gear mounted on said output shaft to form a plurality of sets of electromagnetic clutch plates and free rotating gears;
   f) said plurality of fixed gears being meshed at all times with said free rotating gears on said output shaft;
   g) means for selecting one of said plurality of sets of electromagnetic clutch plates and free rotating gears for activating said output shaft into a forward or reverse rotational movement;
   h) means for transferring electric current from battery or power source to energize one or more of said electromagnetic clutch plates to create a magnetic force for pulling an adjacent free rotating gear axially along said output shaft to bond with said electromagnetic clutch plate to cause rotation of said output shaft.

2. A transmission in accordance with claim 1, wherein said means for selecting includes a manual gear selector having a plurality of forward gear positions, a neutral position and a reverse gear position.

3. A transmission in accordance with claim 2, wherein said manual gear selector has a modified speedometer member attached thereto for the automatic deployment of said plurality of forward gear positions, said neutral position and said reverse gear position for forming an automatic gear selector.

4. A transmission in accordance with claim 1, wherein said means for transferring electric current includes an induction current control member for supplying electrical current from the battery or power source to said means for selecting.

5. A transmission in accordance with claim 4, wherein said induction current control member is used for supplying electrical current from the battery or power source to said manual gear selector or said automatic gear selector.

6. A transmission in accordance with claim 2, wherein said manual gear selector includes a handle shift, handle lever, or push button for making electrical contact with one of said plurality of forward gear positions or reverse gear position so that electric current is transferred directly to one side of one of said electromagnetic clutch plates to create two magnetic forces; a first magnetic force for attracting said adjacent free rotating gear toward said one side of one of said electromagnetic clutch plates and a second magnetic force for solidifying said magnetizable fluid to frictionally engage said one side of one of said electromagnetic clutch plates and said adjacent free rotating gear wherein said adjacent free rotating gear engages said electromagnetic clutch plate to rotate said output shaft.

7. A transmission in accordance with claim 1, further including a compression spring-loaded electromagnetic clutch plate connected to said one end of said input shaft for generating electric current.

8. A transmission in accordance with claim 1, further including an electromagnetic hand disc brake having a brake rotor connected to one end of said output shaft, said hand disc brake including an electromagnetic frame member having movable electromagnetic friction plates; said friction plates each facing both sides of said brake rotor and when electrically energized said friction plates compress simultaneously on said both sides of said brake rotor causing said output shaft to stop rotating.

9. A transmission in accordance with claim 8, wherein said electromagnetic hand disc brake includes an adjustable push button, a lever, a foot pedal or voice activation means for controlling said movable friction plates by varying the electric current to said movable friction plates.

10. A transmission in accordance with claim 1, wherein said interior housing compartment includes a housing fluid channel for said magnetizable fluid for cooling of said housing; and said fluid channel for transporting of said magnetizable fluid along said output shaft.

11. A transmission in accordance with claim 1, wherein said output shaft includes at least one fluid shaft channel for said magnetizable fluid; said magnetizable fluid within said fluid shaft channel being used for lubricating all of the bearings on said output and input shafts and for supplying said magnetizable fluid between said free rotating gears and said plurality of electromagnetic clutch plates and for supplying said magnetizable fluid to the spacers of said output shaft.

12. A transmission in accordance with claim 5, wherein said manual or automatic gear selector includes a commutator on said output shaft for receiving electrical current from said induction current control member; said commutator for transmitting electric current to said rotating output shaft and to one of said plurality of electromagnetic clutch plates.

13. A transmission in accordance with claim 12, said commutator includes a non-electrical conductive ring surrounding said output shaft, a plurality of electrical conductive metal rings each having a separate conductive wire attached thereto; each of said conductive wires being connected to one side of each of said electromagnetic clutch plates for transmitting the electric current independently to each of said electromagnetic clutch plates.

14. A transmission in accordance with claim 1, wherein each side of said plurality of electromagnetic clutch plates includes a synchronization mechanism for bonding between said one side of one of said plurality of electromagnetic clutch plates and said adjacent free rotating gear so that said free rotating gear is synchronized with its adjacent electromagnetic clutch plate, while at the same time said electromagnetic clutch plate pulls said free rotating gear axially along said output shaft towards said electromagnetic clutch plate.

15. A transmission in accordance with claim 1, further including an electromagnetic clutch module connected to said input shaft for generating electric current when the engine flywheel is freely rotating; the generated electric current being supplied to the battery or as a power source for other loads.

16. A transmission in accordance with claim 1, wherein selected ones of said free rotating gears include a gear-plate for providing a surface for engagement with said adjacent electromagnetic clutch plate.

17. A transmission in accordance with claim 1, wherein said means for transferring electric current includes a plurality of electric conduit channels formed in said output shaft for receiving electric conduits for transferring electric current from a power source to said electromagnetic clutch plates.

* * * * *